United States Patent
Boosetty et al.

(10) Patent No.: US 12,374,147 B2
(45) Date of Patent: Jul. 29, 2025

(54) TEMPLATE AGNOSTIC DOCUMENT READER

(71) Applicant: INFOSYS LIMITED, Bangalore (IN)

(72) Inventors: Kalyan Boosetty, Bangalore (IN); Kosigamaani Thirumoorthy, Avinashi (IN)

(73) Assignee: Infosys Limited, Bangalore (IN)

( * ) Notice: Subject to any disclaimer, the term of this patent is extended or adjusted under 35 U.S.C. 154(b) by 422 days.

(21) Appl. No.: 17/704,611

(22) Filed: Mar. 25, 2022

(65) Prior Publication Data

US 2023/0306771 A1   Sep. 28, 2023

(30) Foreign Application Priority Data

Feb. 21, 2022  (IN) .............................. 202241009110

(51) Int. Cl.
  *G06V 30/414*    (2022.01)
  *G06V 30/412*    (2022.01)
  *G06V 30/416*    (2022.01)

(52) U.S. Cl.
  CPC .......... *G06V 30/414* (2022.01); *G06V 30/412* (2022.01); *G06V 30/416* (2022.01)

(58) Field of Classification Search
  CPC .. G06V 30/414; G06V 30/416; G06V 30/412; G06V 30/40; G06V 30/413; G06V 30/153; G06F 16/93; G06K 9/00456; G06K 9/00449; G06K 8/00463
  See application file for complete search history.

(56) References Cited

U.S. PATENT DOCUMENTS

| | | | | |
|---|---|---|---|---|
| 2007/0168382 A1* | 7/2007 | Tillberg | ............... | G06F 7/00 |
| | | | | 707/102 |
| 2011/0249905 A1* | 10/2011 | Singh | ................ | G06K 9/62 |
| | | | | 382/225 |
| 2011/0258150 A1* | 10/2011 | Neogi | ............... | G06F 15/18 |
| | | | | 706/12 |
| 2014/0270526 A1* | 9/2014 | Wu | ................... | G06K 9/34 |
| | | | | 382/177 |
| 2015/0093031 A1* | 4/2015 | Konishi | ............. | G06K 9/46 |
| | | | | 382/190 |

(Continued)

FOREIGN PATENT DOCUMENTS

| | | | | |
|---|---|---|---|---|
| CN | 100419782 C | * | 9/2008 | ............. G06F 17/30 |
| JP | 2003323580 A | * | 11/2003 | ............. G06F 19/00 |

*Primary Examiner* — Delomia L Gilliard
(74) *Attorney, Agent, or Firm* — Finnegan, Henderson, Farabow, Garrett & Dunner LLP

(57) ABSTRACT

A method and/or system for template agnostic document reader for automated extraction of data from documents is disclosed, wherein the kernel values are extracted from document image using which horizontal lines and vertical lines are determined in the document image. The horizontal lines are determined by extracting pixel values representing character width in the document image. The area of intersecting horizontal and vertical lines in the image is identified as tabular section and tabular data is extracted. The area in the document image with text and horizontal lines and absence of vertical lines are identified as forms section and forms data is extracted. The area in the document image without any horizontal lines and vertical lines and with similar line spacing are identified as paragraph section and paragraph data is extracted.

12 Claims, 6 Drawing Sheets

(56) References Cited

U.S. PATENT DOCUMENTS

| | | | |
|---|---|---|---|
| 2016/0063322 A1* | 3/2016 | Dejean | G06K 9/00 |
| 2017/0147552 A1* | 5/2017 | Carroll | G06F 17/24 |
| 2019/0005322 A1* | 1/2019 | Tripathi | G06K 9/00 |
| 2020/0089946 A1* | 3/2020 | Mallick | G06K 9/00 |
| 2020/0097451 A1* | 3/2020 | Pisipati | G06F 16/21 |
| 2020/0159820 A1* | 5/2020 | Rodriguez | G06F 17/24 |
| 2020/0184267 A1* | 6/2020 | Kumar | G06K 9/62 |
| 2020/0348809 A1* | 11/2020 | Drescher | G06F 3/0484 |

* cited by examiner

EXEMPLARY DOCUMENT IMAGE 500

FORM NO. 3BB
[See rule 6DDA]

Monthly statement to be furnished by a stock exchange in respect of transactions in which client codes been modified after registering in the system for the month of

1. Name and address of the Stock Exchange: Bombay stock exchange     504
2. Permanent Account Number: ABCDE123456
3. Details of transaction in which client codes have been modified after registering in system are enclosed in soft copy as annexure.     506

Verification

I USER1234556 hereby certify that all the particulars furnished above are correct and complete.

Place                Signature of the Principal Officer of the Stock Exchange
Date                 Name and Designation

ANNEXURE TO FORM NO. 3BB
(Soft Copy)

Derivative Market

| Sl. No. | Transaction ID | Broker's name & ID | Original Client Code | Modified Client Code | Name of the original client | PAN of the original client | Name of the modified client | PAN of the modified client | Scrip name | Qty. | Rate | Total value of transaction | Buy or Sale | Date of transaction |
|---|---|---|---|---|---|---|---|---|---|---|---|---|---|---|
| 1. | TX1 | BK1 | | | | | | | | | | 5,98,760 | | 12-12-19 |
| 2. | TX2 | BK2 | | | | | | | | | | 4,45,234 | | 09-06-18 |
| 3. | | | | | | | | | | | | | | |
| 4. | | | | | | | | | | | | | | |
| 5. | | | | | | | | | | | | | | |

Cash Market     502

| Sl. No. | Transaction ID | Broker's name & ID | Original Client Code | Modified Client Code | Name of the original client | PAN of the original client | Name of the modified client | PAN of the modified client | Scrip name | Qty. | Rate | Total value of transaction | Buy or Sale | Date of transaction |
|---|---|---|---|---|---|---|---|---|---|---|---|---|---|---|
| 1. | TX3 | BK3 | | | | | | | | | | 1,34,565 | | 03-03-19 |
| 2. | TX4 | BK4 | | | | | | | | | | 3,54,578 | | 03-03-19 |
| 3. | | | | | | | | | | | | | | |
| 4. | | | | | | | | | | | | | | |
| 5. | | | | | | | | | | | | | | |

FIGURE 5

TABULAR DATA 1
602

| Sl. No. | Transaction ID | Broker's name & ID | Original Client code | Modified Client Code | Name of the original client | PAN of the original client | Name of the modified client | PAN of the modified client | Scrip Name | Qty. | Rate | Total value of transaction | Buy or Sale | Date of transaction |
|---|---|---|---|---|---|---|---|---|---|---|---|---|---|---|
| 1. | TX3 | BK3 | | | | | | | | | | 1,34,565 | | 1-Jun-2019 |
| 2. | TX4 | BK4 | | | | | | | | | | 3,54,678 | | 6-Oct-2017 |
| 3. | | | | | | | | | | | | | | |
| 4. | | | | | | | | | | | | | | |
| 5. | | | | | | | | | | | | | | |

TABULAR DATA 2
604

| Sl. No. | Transaction ID | Broker's name & ID | Original Client code | Modified Client Code | Name of the original client | PAN of the original client | Name of the modified client | PAN of the modified client | Scrip Name | Qty. | Rate | Total value of transaction | Buy or Sale | Date of transaction |
|---|---|---|---|---|---|---|---|---|---|---|---|---|---|---|
| 1. | TX1 | BK1 | | | | | | | | | | 6,98,760 | | 12-12-19 |
| 2. | TX2 | BK2 | | | | | | | | | | 4,45,234 | | 09-06-18 |
| 3. | | | | | | | | | | | | | | |
| 4. | | | | | | | | | | | | | | |
| 5. | | | | | | | | | | | | | | |

KEY 1 606 — 2. Permanent Account Number

VALUE 1 608 — ABCDE123456

KEY 2 610 — 1. Name and address of the Stock Exchange

VALUE 2 612 — Bombay stock exchange

FIGURE 6

TEMPLATE AGNOSTIC DOCUMENT READER

This application claims the benefit of Indian Patent Application No. 202241009110, filed Feb. 21, 2022, which is incorporated by reference in its entirety.

FIELD

The present technique relates to image processing. More specifically, the technique relates to automated data extraction from document images.

BACKGROUND

Document Information Extraction methodology helps to process large amounts of business documents that have content in headers and tables. The extracted information is used, for example, to automatically process payables, invoices, or payment notes while making sure that invoices and payables match. After the upload of document file to the service, the methodology returns the extraction results from header fields and line items.

Current industry needs universal OCR systems that can understand the scanned and other document images to pull relevant information. In-order to cater to this requirement, the common methodology used is to train classification models to identify document structures and thereby extract information based on the classification of document type. To extract the relevant information from the documents, the current OCR systems work on template of documents and the information is extracted based on the stored templates. This encompasses drawbacks/challenges to implement such as—(a) High volumes of pre-existing samples used for training; (b) Extensive time for training for classification of the documents; (c) Effort spent on re-training of models in case of new templates; and (d) Need of creation of new models/configurations to extract data from the scanned/digital documents. This is an iterative, time consuming and costly process to achieve the goal of data digitization. Hence, there is a need of an efficient system which can address the above-mentioned problems.

SUMMARY

Presently, the automated process in digitization requires trained systems, wherein the systems are trained using templates and previously used/stored documents. The present invention eliminates the need of training data, works dynamically to extract information from any documents without templatizing them.

Disclosed are a system, a method and/or a non-transitory computer readable storage medium for template agnostic document reader for automated extraction of data from documents, according to one or more embodiments. The system may be configured to extract alpha-numeric data from the scanned image of documents without a need of templatizing the documents for machine learning models, in an efficient way, thereby eliminating the need of training machine learning models, as disclosed in various embodiments of the present disclosure.

In one aspect, a computer implemented method for template agnostic document reader for automated extraction of data from documents is disclosed. The method comprising, receiving an image of the document as input either from a client device associated with a user or from a database where the documents or document images are stored. One or more horizontal lines in the image are determined by extracting kernel values from the image. To determine one or more horizontal lines in the image by extracting kernel values from the image, pixel values representing width of each character in the image may be extracted as the kernel values. The extracted kernel values may be segmented into plurality of clusters. A potential cluster from the plurality of clusters may be determined and a potential kernel value from the potential cluster may be determined using which the one or more horizontal lines are determined in the image. As a next step, one or more vertical lines are determined in the image. One or more portions of the image are identified as tabular section which is bound by intersecting pixels of the determined one or more horizontal lines and the determined one or more vertical lines. A data that is present in the identified tabular section is extracted as tabular data.

As a next step, one or more portions of the image are identified as forms section which comprises the one or more horizontal lines and absence of the one or more intersecting vertical lines, and data from the forms section is extracted as forms data which comprises data in the form of key-value pairs. As a next step, one or more portions in the image without the one or more horizontal lines and the without one or more vertical lines is identified as paragraph data, and the data from the paragraph section is extracted as paragraph data.

In another aspect, a system for template agnostic document reader for automated extraction of data from documents is disclosed. The system comprising one or more components, but not limited to a processor, a memory unit operatively coupled to the processor, wherein the processor is configured to receive an image of the document as input either from a client device associated with a user or from a database where the documents or document images are stored. One or more horizontal lines in the image are determined by extracting kernel values from the image. To determine one or more horizontal lines in the image by extracting kernel values from the image, pixel values representing width of each character in the image may be extracted as the kernel values. The extracted kernel values may be segmented into plurality of clusters. A potential cluster from the plurality of clusters may be determined and a potential kernel value from the potential cluster may be determined using which the one or more horizontal lines are determined in the image. As a next step, one or more vertical lines are determined in the image. One or more portions of the image are identified as tabular section which is bound by intersecting pixels of the determined one or more horizontal lines and the determined one or more vertical lines. A data that is present in the identified tabular section is extracted as tabular data.

As a next step, one or more portions of the image are identified as forms section which comprises the one or more horizontal lines and absence of the one or more intersecting vertical lines, and data from the forms section is extracted as forms data which comprises data in the form of key-value pairs. As a next step, one or more portions in the image without the one or more horizontal lines and the without one or more vertical lines is identified as paragraph data, and the data from the paragraph section is extracted as paragraph data.

In yet another aspect, a non-transitory computer readable storage medium for template agnostic document reader for automated extraction of data from documents is disclosed. The non-transitory compute readable storage medium comprising machine executable code which when executed by at least one processor, causes the at least one processor to perform steps such as, receiving an image of the document as input either from a client device associated with a user or from a database where the documents or document images are stored. One or more horizontal lines in the image are determined by extracting kernel values from the image. To determine one or more horizontal lines in the image by extracting kernel values from the image, pixel values representing width of each character in the image may be extracted as the kernel values. The extracted kernel values may be segmented into plurality of clusters. A potential cluster from the plurality of clusters may be determined and a potential kernel value from the potential cluster may be determined using which the one or more horizontal lines are determined in the image. As a next step, one or more vertical lines are determined in the image. One or more portions of the image are identified as tabular section which is bound by intersecting pixels of the determined one or more horizontal lines and the determined one or more vertical lines. A data that is present in the identified tabular section is extracted as tabular data.

As a next step, one or more portions of the image are identified as forms section which comprises the one or more horizontal lines and absence of the one or more intersecting vertical lines, and data from the forms section is extracted as forms data which comprises data in the form of key-value pairs. As a next step, one or more portions in the image without the one or more horizontal lines and the without one or more vertical lines is identified as paragraph data, and the data from the paragraph section is extracted as paragraph data.

The system, the method, and/or the non-transitory computer readable storage medium disclosed herein may be implemented in any means for achieving various aspects and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE FIGURES

Exemplary embodiments are illustrated by way of example and not limitation in the figures of the accompanying drawings, in which like references indicate similar elements and in which:

FIG. 5 is an exemplary image of a document, according to one or more embodiments.

FIG. 6 is an exemplary tabular data and forms data rendered as output by the system for template agnostic document reader for automated extraction of data from documents, according to one or more embodiments.

Figure 1:
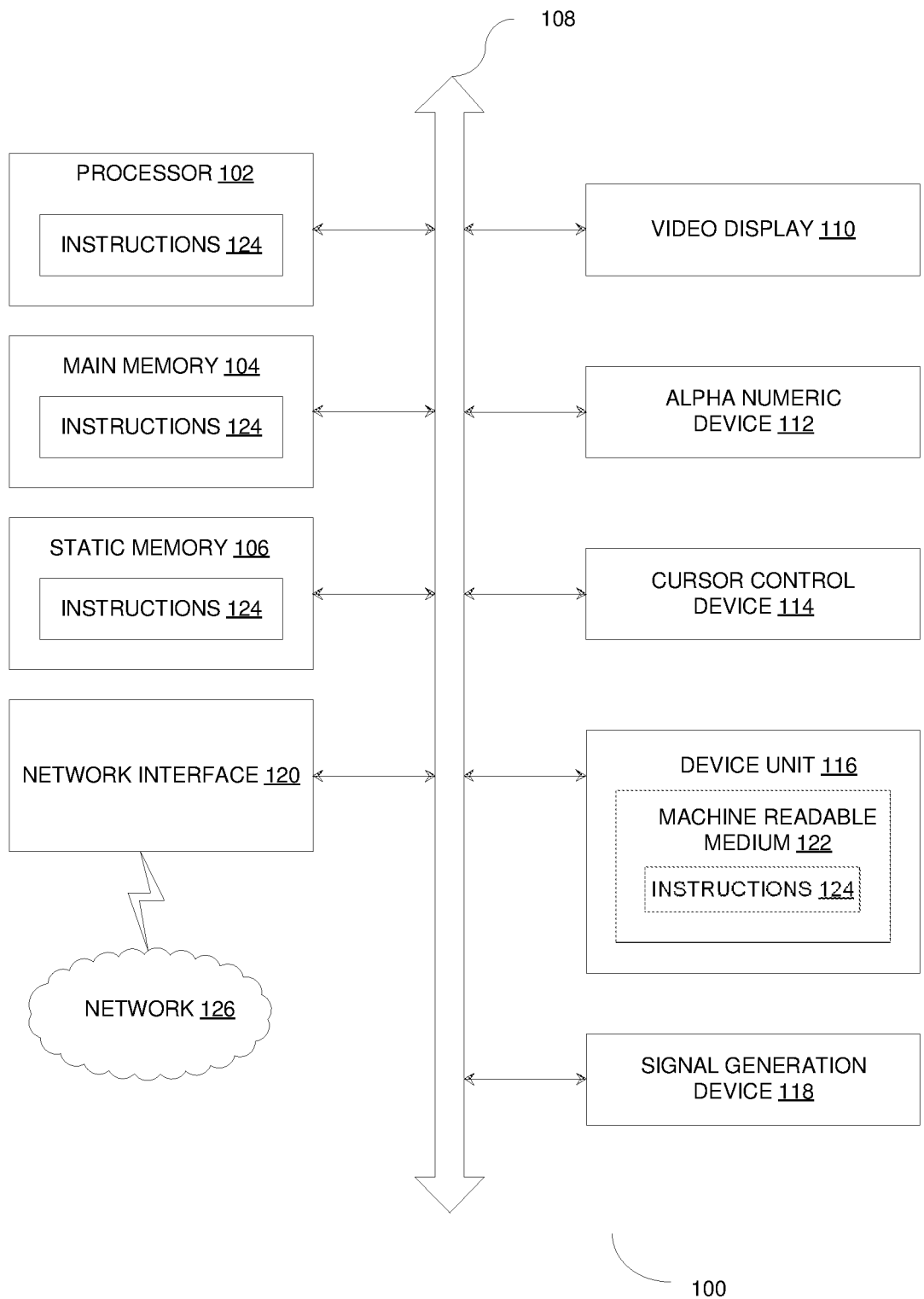
FIG. 1 is a diagrammatic representation of a data processing system capable of processing a set of instructions to perform any one or more of the methodologies herein, according to one or more embodiments.

Other features of the present embodiments will be apparent from the accompanying drawings and from the detailed description that follows.

DETAILED DESCRIPTION

The invention in the present disclosure is aimed to overcome the technical problem mentioned in the background section in the domain of digitizing contents, through a novel system/method for template agnostic document reader for automated extraction of data from documents, as described in various embodiments of the present disclosure. The technique described in the present disclosure aims to extract the data from scanned documents without templatizing the document. In conventional way of image processing, the developers need to hardcode kernel values (vector of pixels) that are essential for OpenCV image processing, wherein the technique described in the present disclosure determines the kernel values from the document image itself, automatically, using Machine Learning approach to identify correct kernel applicable for a given document image, thus eliminating manual intervention/developer inputs for processing different format of images containing tables and forms.

In one or more embodiments, the image of the document may be converted into binary image. Then the pixel differences in the image may be identified based on darker shade and lighter shade, all the lines (horizontal lines and vertical lines) in terms of pixels present in the document image may be identified and each line may be identified as separate image. Understanding the character width and height and eliminating the ones that are very close to each other, which is not preconfigured but based on the understanding of the pixel size of characters that are available in the image is one of the major aspects of the present technique.

Extracting horizontal lines is the trickiest part. Nearest neighbor (Machine Learning model) is used to identify possible horizontal kernel. Next is to determine whether the horizontal kernel overlap with vertical kernel and whether there is an intersection. The intersection defines a table(s) and tabular data is extracted from the table(s). Then forms data may be extracted as key value-pairs, then paragraph data is extracted from the document. The present disclosure doesn't limit the order in which the data may be extracted, i.e., first the tabular data, then the forms data and paragraph data. In one or more embodiments, tabular data, forms data and paragraph data may be extracted in any order based on presence of tabular section, forms section and paragraph sections in the document image. In one or more embodiments, identification of tabular section, forms section and paragraph section and extraction of tabular data, forms data and paragraph data may be executed by the system simultaneously/parallelly, or in any order or combination based on the data present in the document image, automatically.

In one or more embodiments, a computer implemented method for template agnostic document reader for automated extraction of data from documents is disclosed. The method comprising receiving an image of the document as input either from a client device associated with a user or from a database where the documents or document images are stored. One or more horizontal lines in the image may be determined by extracting kernel values from the image. To determine one or more horizontal lines in the image by extracting kernel values from the image, pixel values representing width of each character in the image may be extracted as the kernel values. The extracted kernel values may be segmented into plurality of clusters. A potential cluster from the plurality of clusters may be determined and a potential kernel value from the potential cluster may be determined using which the one or more horizontal lines are determined in the image. As a next step, one or more vertical lines may be determined in the image. One or more portions of the image may be identified as tabular section which is bound by intersecting pixels of the determined one or more horizontal lines and the determined one or more vertical lines. A data that is present in the identified tabular section may be extracted as tabular data.

As a next step, one or more portions of the image may be identified as forms section which comprises the one or more horizontal lines and absence of the one or more intersecting vertical lines, and data from the forms section may be extracted as forms data which comprises data in the form of key-value pairs. As a next step, one or more portions in the image without the one or more horizontal lines and the without one or more vertical lines may be identified as paragraph data, and the data from the paragraph section may be extracted as paragraph data. The technology described in the present disclosure doesn't require any templates beforehand which makes the present technology template agnostic.

FIG. 1 is a diagrammatic representation of a machine and/or data processing device capable of processing a set of instructions to perform any one or more of the methodologies herein, according to one embodiment. The machine and/or the data processing device in the example form, comprises a computer system 100 within which a set of instructions, for causing the machine to perform any one or more of the methodologies discussed herein, may be executed. In various embodiments, the machine operates as a standalone device and/or may be connected (e.g., networked) to other machines.

A machine may be a personal computer (PC), laptop or an embedded system and/or any machine capable of executing a set of instructions (sequential or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

Figure 2:
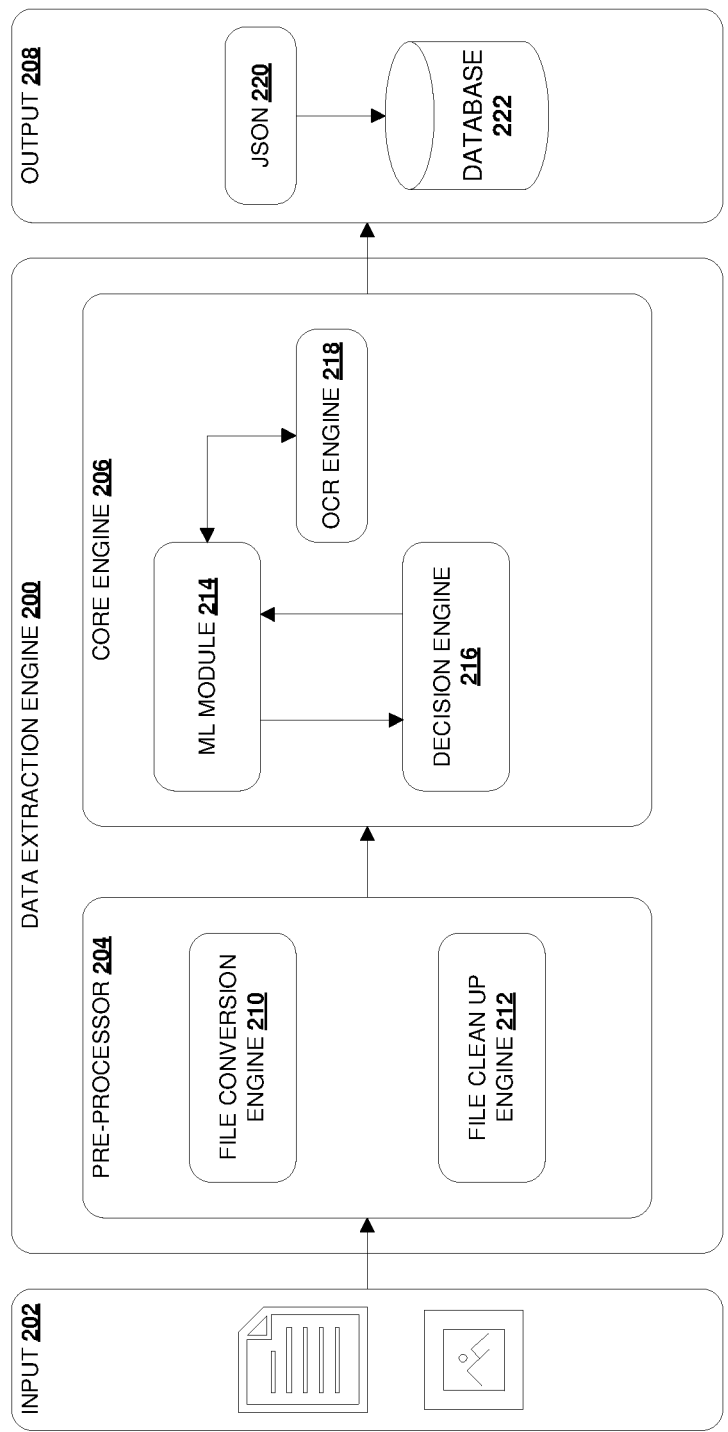
FIG. 2 is an architecture diagram illustrating plurality of components of the system for template agnostic document reader for automated extraction of data from documents, according to one or more embodiments.

FIG. 2 is an architecture diagram illustrating plurality of components of the system for template agnostic document reader for automated extraction of data from documents, according to one or more embodiments. The system (also referred as Template Agnostic document reader or data extraction engine 200) may comprise one or more components such as, but not limited to, a pre-processor module 204 and a core engine 206, wherein the data extraction engine 200 is configured to receive input from input module 202 and process the data, extract information (which will be described in subsequent paragraphs) and send results to output module 208. The input module 202 may be configured to send input data comprising a document (either in image or document format such as pdf, doc etc.) to the data extraction engine 200. The output may be in the format of JSON or split images or combination thereof, which may be stored in a computer database 222 for further processing. In one or more embodiments, the system may be implemented as a client—server architecture wherein the input module 202, data extraction engine 200 and output module 208 may be implemented as server-side components and the user is able to access the components through a client device (not represented in Figures) over a computer network. In one or more embodiments, the input module 202, data extraction engine 200 and output module 208 may be implemented locally, at the client device thereby reducing the bandwidth consumption over computer network. Any of the modules of the system disclosed herein may be moved between client and server spaces based on requirement of the user.

In one or more embodiments, the pre-processor module 204 of the data extraction engine 200 may comprise one or more components such as, but not limited to a file conversion engine 210, and a file clean-up engine 212. The core engine 206 of the data extraction engine 200 may comprise one or more components such as, but not limited to, a Machine Learning module 214 (ML module 214), a decision engine 216 and an OCR engine 218.

In one or more embodiments, the input may comprise any document in a format that is computer readable such as, but not limited to .pdf, .doc etc. The input may also be in the image format, such as, but not limited to .jpg, .png, .tif, and/or .tiff. The input may be communicated to the pre-processor 204 of the data extraction engine 200. If there are more than one pages in a document, the file conversion engine 210 may be configured to split the document into individual pages and each page may be converted to image format (document image). The document image may be converted to a binary image format for further processing.

File clean-up engine 212 may be configured to remove salt and pepper noise (Random Black and White pixels which may be present due to low picture quality) and/or to tilt document image for vertical alignment where images can be slanted with respect to vertical axis. The ML Module 214 may be configured to determine horizontal kernel that is used for identification of horizontal lines, which is described in detail in subsequent paragraphs along with FIG. 4.

The decision engine 216 may be configured to decide which process should be called/executed based on presence of features like horizontal lines, vertical lines, character height. These processes may include identification of tabular section, identification of forms section and identification of paragraphs section. The OCR engine 218 may be configured to convert image into data using third party software like Tesseract.

Figure 3:
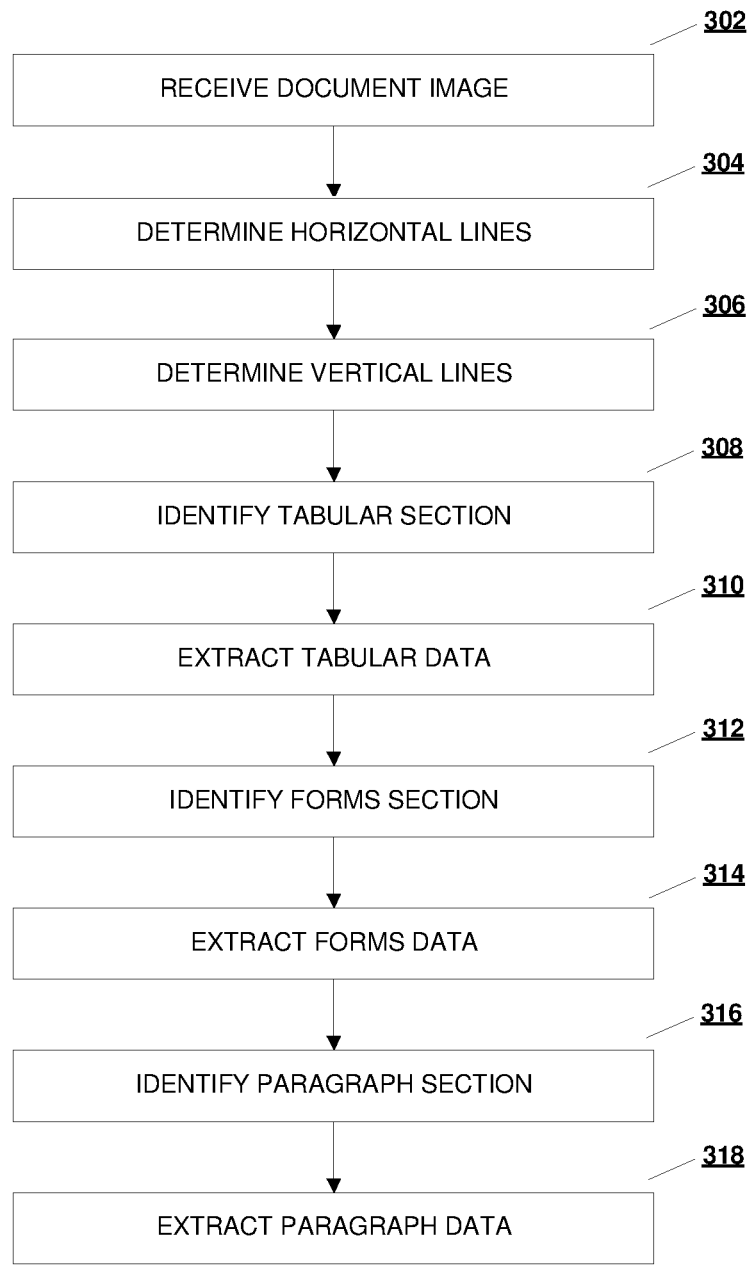
FIG. 3 is a process flow diagram illustrating sequence of steps executed by the system for template agnostic document reader for automated extraction of data from documents, according to one or more embodiments.

FIG. 3 is a process flow diagram illustrating sequence of steps executed by the system for template agnostic document reader for automated extraction of data from documents, according to one or more embodiments. In one or more embodiments, an image of the document (also referred as 'document image') may be received as in step 302. The image may be received either from the client device as input from user or may be fetched by the system from database based on input from the user comprising instruction to initiate the data extraction along with the location information (storage path) of the image in the database. In one or more embodiments, the storage path of the image may be pre-configured in the system.

One or more horizontal lines in the image by may be determined by extracting kernel values from the image, as in step 304. In one or more embodiments, one or more horizontal lines are determined by extracting pixel values representing width of each character in the image as kernel values. The extracted kernel values may be segmented into plurality of clusters. A potential cluster from the plurality of clusters may be determined and a potential kernel value from the potential cluster is determined using which the one or more horizontal lines in the image are determined, which is described in detail in subsequent paragraphs, with an example embodiment.

One or more vertical lines may be determined in the image, as in step 306. One or more one or more portions of the image may be identified as tabular section(s) (also referred as 'tabular area') that is bound by intersecting pixels of the determined one or more horizontal lines and the determined one or more vertical lines, as in step 308 and data from the tabular section may be extracted as a tabular data, as in step 310, the tabular data comprising, but not limited to alpha-numeric characters, special characters, or combination thereof.

One or more portions of the image may be identified as a forms section(s) comprising the one or more horizontal lines and without the one or more vertical lines as in step 312 and data from the forms section(s) (also referred as 'forms area') may be extracted as forms data comprising key-value pairs, as in step 314. The forms data may comprise data as, but not limited to alpha-numeric characters, special characters, or combination thereof. One or more portions in the image without the one or more horizontal lines and without the one or more vertical lines may be identified as a paragraph section(s) (also referred as 'paragraph area'), as in step 316 and data from the paragraph section(s) may be extracted as a paragraph data, as in step 318. The paragraph data may comprise data as, but not limited to alpha-numeric characters, special characters, or combination thereof. The detailed working of system is described with an example embodiment in subsequent paragraphs of the present disclosure.

Figure 4:
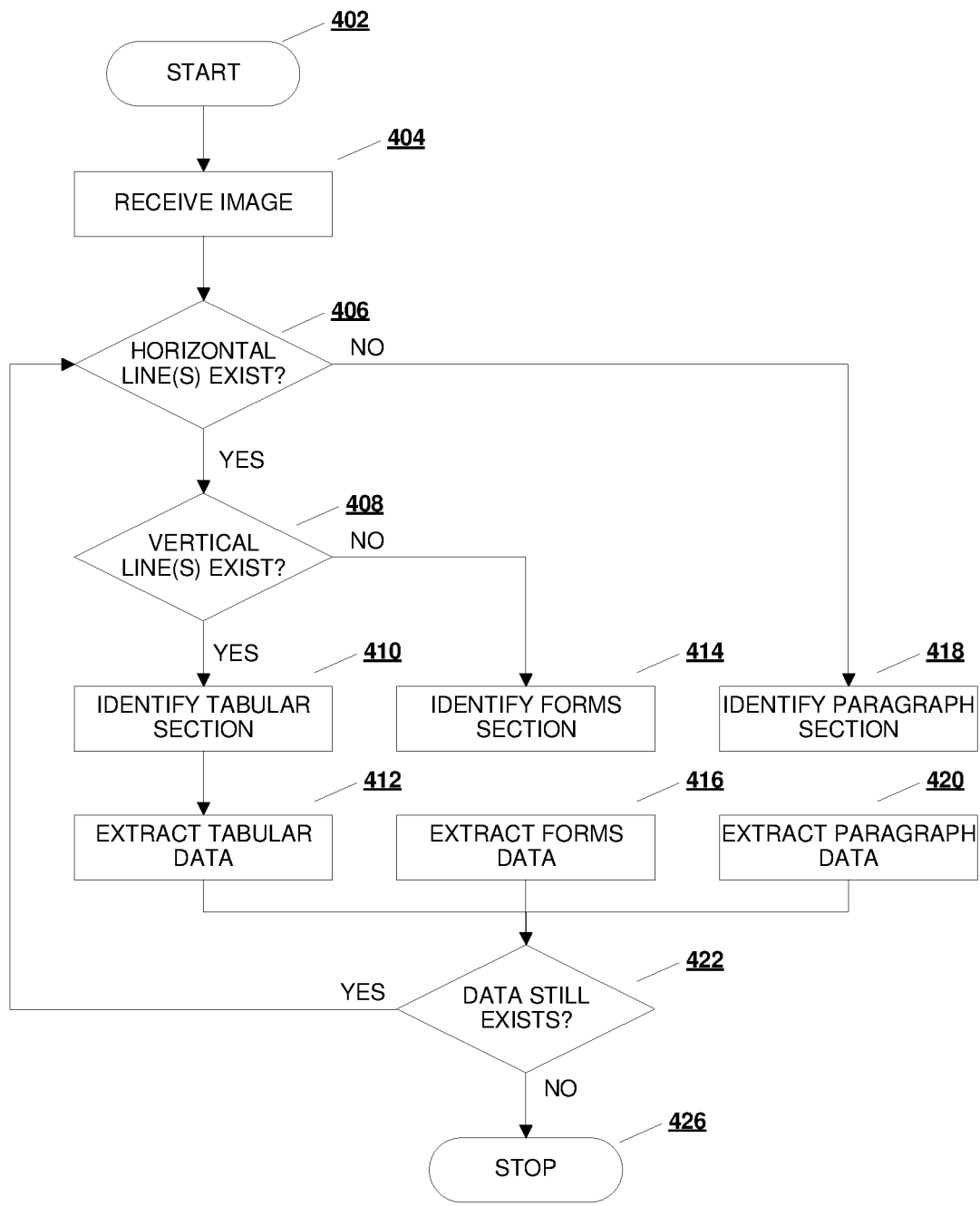
FIG. 4 is a flowchart illustrating sequence of steps executed by the system for template agnostic document reader for automated extraction of data from documents, according to one or more embodiments.

FIG. 4 is a process flow diagram illustrating sequence of steps executed by the system for template agnostic document reader for automated extraction of data from documents, according to one or more embodiments. In one or more embodiments, to begin with (402), an image format of the document may be received as in step 404. The received image format of the document (also referred as document image) may be converted into a binary image format. The system may be configured to determine one or more horizontal lines present in the document image by way of resolving a cluster of kernel values, and resolving a kernel values as in step 406.

In an exemplary embodiment, consider a sample image of a document (500) as illustrated in FIG. 5, which comprises tabular data (502), forms data (504), and a paragraph data (506). What is being considered for data extraction and clustering is not the characters present in the document image but the aspect of the characters such as width of the characters and/or lines present in the document image. To determine and extract one or more horizontal lines present in the binary image format of the document image, an array of pixel values (also referred as kernel values) representing horizontal width of every character and/or line in the binary image may be extracted from the binary image of the document image. With the exemplary document image in FIG. 5, after converting it to binary image (not illustrated in figures) the extracted kernel values may look like:

{0, 129, 2, 3, 132, 133, 134, 7, 136, 6, 10, 8, 12, 13, 142,
11, 14, 9, 16, 15, 18, 149, 4, 151, 152, 25, 5, 27, 21, 22,
26, 24, 34, 38, 40, 59, 62, 64, 65, 1742, 84, 17, 19, 20}

The extracted kernel values may be used to determine a potential kernel value for horizontal line identification and extraction. For that, the above-mentioned pixel values may be grouped into one or more clusters, using a clustering algorithm. For the model to learn in an unsupervised way (k-means), no previous information is used, but what is present in the image is used. The possible clustering would be—one cluster representing pixel values horizontal lines, and another cluster representing pixel values of text. In the current example embodiment, the pixel values may be grouped into four cluster to get better standard deviation and to differentiate horizontal lines form the text efficiently. The aim is to find that particular cluster which comprises horizontal lines in which case the rest of the clusters comprises text of different pixel width.

The next question is how to judge the cluster, for which the standard deviation helps to understand how disperse the distribution of value is. The basic assumption is that, for any cluster to have a maximum distance, the standard deviation value will be at least 20. To begin with, a threshold value for standard deviation to determine a cluster may be set for the value '20'. As the step proceeds, as and when the standard deviation is calculated for higher clusters, this value will be compared against all the clusters and its standard deviation at every iteration. The cluster with low value of standard deviation indicates that most of the characters are too close to one another and there is very less possibility of presence of table. If a table is present in the document image and as the table comprises the horizontal line, the standard deviation rises abruptly as there will be high difference between pixel width of characters and the pixel width of the line which is part of table. If there is no table, then all the clusters will have less standard deviation. This helps in differentiating horizontal lines and the text in the document image.

The pixel values in the array may be grouped into one cluster, and in further processing, the pixel values are grouped into two cluster in second iteration, three clusters in third iteration and then grouped into four clusters in fourth iteration. The reason for iterating till four clusters is to find kernel length in a portion of an image containing table. It is enough to run for two clusters such that one cluster comprises all horizontal lines from table and another cluster will hold all character width present in a table or in any other part of the image. Four iterations are executed for clustering the pixel values to cover any cases involving characters of variable width. An assumption is—in any document, a font size of a character will be of same size with some special case that may include table headers with variable font size.

If length of the array is less than the number of clusters, the k-means algorithm stops and the available value may be extracted as the kernel value. In the present example embodiment, by executing the k-means clustering algorithm, a cluster label may be assigned to every pixel value in the array with one-to-one mapping, which may look as illustrated below:
[0 2 0 0 2 2 2 0 2 0 0 0 0 0 2 0 0 0 0 0 0 2 0 2 2 0 0 0 0 0 0 0 0 3 3 3 3 3 3 1 3 0 0 0]
wherein the values 0, 1 2 and 3 represents the cluster label.

The frequency of each of the labels may be identified based on the clustering. The frequency here represents the number of pixel values in each cluster, which may be represented with the format [(label, frequency), . . . (label, frequency)], which may look in the current example as—[(0, 27), (2, 9), (3, 7), (1, 1)] which may illustrate that first cluster ('0') comprises 27 values, second cluster ('2') comprises 9 values, third cluster ('3') comprises 7 values and fourth cluster ('1') comprises one value. The cluster label with maximum frequency may be considered for further processing. From the above-mentioned example, it is evident that the cluster '0' has maximum frequency count of 27. As a next step, the system may be configured to resolve the cluster ('0') to get the value of standard deviation.

Resolving clusters: Since multiple clusters are involved in the process, it is important to filter out unwanted clusters. The array of pixels is:
{0, 129, 2, 3, 132, 133, 134, 7, 136, 6, 10, 8, 12, 13, 142, 11, 14, 9, 16, 15, 18, 149, 4, 151, 152, 25, 5, 27, 21, 22, 26, 24, 34, 38, 40, 59, 62, 64, 65, 1742, 84, 17, 19, 20}
The cluster labels are:
[0 2 0 0 2 2 2 0 2 0 0 0 0 0 2 0 0 0 0 0 0 2 0 2 2 0 0 0 0 0 0 0 0 3 3 3 3 3 3 1 3 0 0 0]
An updated array may be created with pixel values grouped together with array labels, which may look as represented below:
{0: [0, 2, 3, 7, 6, 10, 8, 12, 13, 11, 14, 9, 16, 15, 18, 4, 25, 5, 27, 21, 22, 26, 24, 34, 17, 19, 20],
2: [129, 132, 133, 134,136, 142, 149, 151, 152],
3: [38, 40, 59, 62, 64, 65, 84],
1: [1742]}
A standard deviation of the largest cluster (i.e., cluster ('0')) may be determined which is 8.54400374531753. As a next step, the largest cluster may be removed from entire cluster group which helps to remove those pixel values of the text characters with similar width. As a results, the resultant cluster may look like as represented below:
{2: [129, 132, 133, 134, 136, 142, 149, 151, 152],
3: [38, 40, 59, 62, 64, 65, 84],
1: [1742]}
If the total number of clusters is one and if the calculated standard deviation is less than the threshold value, then that remaining particular cluster is a resultant cluster for further calculation. Also, as the iteration proceeds and if the previously calculated standard deviation and the standard deviation with the resultant cluster is same, then further clustering may not be required as the same standard deviation value across iterations indicates that the elements (pixel widths) are closely placed to one another. The next step is to extract kernel value by resolving kernels.

Resolving Kernel: After resolving the cluster, the next step is to resolve kernel and extract potential kernel value which helps in determining the horizontal lines. From the array of pixel values (width values or kernel candidates), the largest value needs to be removed as the aim is to find minimum width value for kernel determination. A maximum threshold may be set to find table width, wherein any pixel of width higher than the value '50' is a potential candidate for horizontal line because normal characters in a document will be of size between 30-pixel and 40-pixel width. All the clusters that are determined may be considered by the system for processing:
{0: [0, 2, 3, 7, 6, 10, 8, 12, 13, 11, 14, 9, 16, 15, 18, 4, 25, 5, 27, 21, 22, 26, 24, 34, 17, 19, 20],
2: [129, 132, 133, 134, 136, 142, 149, 151, 152],
3: [38, 40, 59, 62, 64, 65, 84],
1: [1742]}
The largest cluster may be removed, and the resultant cluster may be as below:
{2: [129, 132, 133,134, 136, 142, 149, 151, 152],
3: [38, 40, 59, 62, 64, 65, 84],
1: [1742]}
An array with unique pixel values may be created and the resultant array with unique pixel values may be as below:
{64, 129, 65, 132, 133, 134, 38, 136, 40, 142, 1742, 84, 149, 151, 152, 59, 62}
All the pixel values below the threshold value may be removed which results in elimination of the pixel values of character widths and the resultant array may look as represented below:
{64, 129, 65, 132, 133, 134, 136, 142, 1742, 84, 149, 151, 152, 59, 62}
The minimum value in the resultant array may be identified as potential kernel value, which indicates that any pixel width in the document image, which is equal to, or more than the determined potential kernel value will be the horizontal line of a table. Here, the minimum value is '59'. The potential kernel value that is extracted may be used by OpenCV to determine all the horizontal lines in the document image. As a next step, the presence of all the vertical lines in the document image is determined through two step process—by grouping length of similar vertical lines together and with relative difference between vertical lines greater than a pre-defined threshold, as in step 408.

To determine all the vertical lines in the document image, all the vertical pixel height of pre-defined threshold are identified and grouped together, say a threshold value of '10' in the present example embodiment which may be pre-defined by the user as it represents the minimum value of any character height in the document. Once all the pixel values are identified, then relative difference between each of the identified vertical lines may be identified and the vertical lines with relative height difference of greater than pre-defined value may be identified as vertical lines that forms the table. For example, a character in the document image may be of height 10 pixels and a vertical line forming the table maybe of height 60 pixels and this higher relative difference is more and the latter pixel value may be determined as vertical line, as in step 408.

The area/section of the document image where the horizontal lines and the vertical lines intersect are identified as tabular section as in step 410 and the data present in the tabular section may be extracted by the system as tabular data, as in step 412 using OCR techniques. The data extracted as tabular data may be either or combination of alpha-numeric or special character or any type of character that the OCR engine 218 (FIG. 2) can extract from the document image. Exemplary tabular data 'Tabular data 1' (602) and 'Tabular data 2' (604) is illustrated in FIG. 6. After determining and extracting the tabular area, if data is still present in the document image as per the check in step 422, the loop continues. All the tabular data are cropped and extracted from the document image. As per the check, if there are more horizontal lines and more vertical lines and there is an intersection, then all the tabular data may be extracted from the document image.

If there are more horizontal lines as per the check in step 406 and no vertical lines as per the check in step 408, that section in the document image may be identified as the forms section as in step 414 and forms data is extracted from the forms section as in step 416 as key-value pairs, wherein the text preceding the horizontal line is considered as a key and the text present along with the horizontal line is considered as the value in key-value pair. The extracted key-value pairs may be stored in the database either in the form of image or JSON format. The data extracted as forms data may be either or combination of alpha-numeric or special character or any type of character that the OCR engine 218 (FIG. 2) can extract from the document image. Exemplary forms data—key-pair 1: 'Key 1' (606) and 'Value 1' (608), key-pair 2: 'Key 2' (610) and 'Value 2' (612) is illustrated in FIG. 6. As a next step, if more data is present in the document image as per the check in step 422, then the loop continues as illustrated in FIG. 4. As per the check in step 406 and 408, there may be no remaining tabular data and the forms data and hence there may not be any horizontal lines and vertical lines in the document image. If there are no horizontal lines as per the check in step 406 and if there are no vertical lines as per the check in step 408, the remaining section of the document image may be identified as paragraph section as in step 418 and the paragraph data may be extracted as in step 420.

To extract paragraph data, the line spacing between maximized character contour in the image is evaluated. Maximum number of characters which share the same boundary may be considered for line space identification. Then, similar line spaces are grouped together to identify a paragraph section and the data between the grouped line spacing may be extracted as paragraph data. The extracted paragraph data may be saved in the database either as image or JSON format. The data extracted as paragraph data may be either or combination of alpha-numeric or special character or any type of character that the OCR engine 218 (FIG. 2) can extract from the document image. As all the data extracted from the document image, if no further data is present for extraction as per the check in step 422, the system stops (426) the processing as the data extraction is complete.

After extraction of tabular data, forms data and paragraph data from the image document, the system may store the extracted data either in the image format or JSON format 220. In case of storing in image format, the tabular data (for example) that is extracted may be saved as an image of the whole table, or each cell in the table may be split and converted into individual images and stored in the database for further processing or dissemination of extracted data.

In one or more embodiments, a non-transitory computer readable storage medium for template agnostic document reader for automated extraction of data from documents is disclosed. The non-transitory compute readable storage medium comprising machine executable code which when executed by at least one processor, causes the at least one processor to perform steps such as, receiving an image of the document as input either from a client device associated with a user or from a database where the documents or document images are stored. One or more horizontal lines in the image may be determined by extracting kernel values from the image. To determine one or more horizontal lines in the image by extracting kernel values from the image, pixel values representing width of each character in the image may be extracted as the kernel values. The extracted kernel values may be segmented into plurality of clusters. A potential cluster from the plurality of clusters may be determined and a potential kernel value from the potential cluster may be determined using which the one or more horizontal lines are determined in the image. As a next step, one or more vertical lines may be determined in the image. One or more portions of the image may be identified as tabular section which is bound by intersecting pixels of the determined one or more horizontal lines and the determined one or more vertical lines. A data that is present in the identified tabular section may be extracted as tabular data.

As a next step, one or more portions of the image may be identified as forms section which comprises the one or more horizontal lines and absence of the one or more intersecting vertical lines, and data from the forms section may be extracted as forms data which comprises data in the form of key-value pairs. As a next step, one or more portions in the image without the one or more horizontal lines and the without one or more vertical lines may be identified as paragraph data, and the data from the paragraph section may be extracted as paragraph data.

Advantage of the technique described in the present disclosure is that—no pre-trained models are required to extract information from the image in structured format. Hardware requirement is low when compared to pre-trained neural network models which require high computing machines, thereby improving the efficiency with current computing resources. The novel technique in the present disclosure also eliminates the need of binding pre-defined templates for information extraction. In general, neural network model consume lot of time in training and model evaluation with most of the time spent in dataset preparation, which is eliminated with the present technique, and the process is made simple, effective and efficient with the technique described in the present disclosure.

The specification and drawings in the present disclosure are to be regarded in an illustrative rather than a restrictive sense.

We claim:

1. A computer implemented method for template agnostic document reader for automated extraction of data from documents, comprising:
   receiving, at a processor, an image of a document;
   determining, by the processor, one or more horizontal lines in the image by extracting kernel values from the image, wherein the kernel values are pixel values representing width of each character in the image;
   determining, by the processor, one or more vertical lines in the image;
   identifying, by the processor, one or more portions of the image as a tabular section bound by intersecting pixels of the one or more horizontal lines and the one or more vertical lines; and
   extracting, by the processor, data from the tabular section as tabular data.

2. The computer implemented method of claim 1, comprising:
   identifying, by the processor, one or more portions of the image as a forms section comprising the one or more horizontal lines and absence of the one or more vertical lines; and extracting, by the processor, data from the forms section as forms data comprising key-value pairs.

3. The computer implemented method of claim 1, comprising:

identifying, by the processor, one or more portions in the image without the one or more horizontal lines and without the one or more vertical lines as a paragraph section; and extracting, by the processor, data from the paragraph section as paragraph data.

4. The computer implemented method of claim 1, wherein the determining of the horizontal lines in the image by extracting the kernel values from the image comprises:

extracting, by the processor, pixel values representing width of each character in the image as the kernel values;

segmenting, by the processor, the kernel values into a plurality of clusters;

determining, by the processor, a potential cluster from the plurality of clusters; and determining, by the processor, a potential kernel value from the potential cluster to determine the one or more horizontal lines in the image.

5. A template agnostics document reader system for automated extraction of data from documents, comprising:

at least one processor;

at least one memory unit operatively coupled to the at least one processor, having instructions stored thereon that, when executed by the at least one processor, causes the at least one processor to:

receive an image of a document;

determine one or more horizontal lines in the image by extracting kernel values from the image, wherein the kernel values are pixel values representing width of each character in the image;

determine one or more vertical lines in the image;

identify one or more portions of the image as a tabular section bound by intersecting pixels of the one or more horizontal lines and the one or more vertical lines; and extract data from the tabular section as tabular data.

6. The system of claim 5, wherein the at least one processor is further configured to:

identify one or more portions of the image as a forms section comprising the one or more horizontal lines and absence of the one or more vertical lines; and extract data from the forms section as forms data comprising key-value pairs.

7. The system of claim 5, wherein the at least one processor is further configured to:

identify one or more portions in the image without the one or more horizontal lines and without the one or more vertical lines as a paragraph section; and extract data from the paragraph section as paragraph data.

8. The system of claim 5, wherein to determine the horizontal lines in the image by extracting the kernel values from the image, the at least one processor is configured to:

extract pixel values representing width of each character in the image as the kernel values;

segment the kernel values into plurality of clusters;

determine a potential cluster from the plurality of clusters; and determine a potential kernel value from the potential cluster to determine the one or more horizontal lines in the image.

9. A non-transitory computer-readable medium having stored thereon instructions for template agnostic document reader for automated extraction of data from documents, the non-transitory computer-readable medium comprising machine executable code which when executed by at least one processor, causes the at least one processor to perform steps comprising:

receiving an image of a document;

determining one or more horizontal lines in the image by extracting kernel values from the image, wherein the kernel values are pixel values representing width of each character in the image;

determining one or more vertical lines in the image;

identifying one or more portions of the image as a tabular section bound by intersecting pixels of the one or more horizontal lines and the one or more vertical lines; and extracting data from the tabular section as tabular data.

10. The non-transitory computer-readable medium of claim 9, wherein the at least one processor is caused to perform steps comprising:

identifying one or more portions of the image as a forms section comprising the one or more horizontal lines and absence of the one or more vertical lines; and extracting data from the forms section as forms data comprising key-value pairs.

11. The non-transitory computer-readable medium of claim 9, wherein the at least one processor is caused to perform steps comprising:

identifying one or more portions in the image without the one or more horizontal lines and without the one or more vertical lines as a paragraph section; and extracting data from the paragraph section as paragraph data.

12. The non-transitory computer-readable medium of claim 9, wherein for determining the horizontal lines in the image by extracting the kernel values from the image, the at least one processor is caused to perform steps comprising:

extracting pixel values representing width of each character in the image as the kernel values;

segmenting the kernel values into plurality of clusters;

determining a potential cluster from the plurality of clusters; and determining a potential kernel value from the potential cluster to determine the one or more horizontal lines in the image.

\* \* \* \* \*